Oct. 13, 1936.   E. J. W. RAGSDALE   2,057,632
ELECTRIC RESISTANCE WELDING SYSTEM
Filed Nov. 12, 1930   3 Sheets-Sheet 1

Oct. 13, 1936.     E. J. W. RAGSDALE     2,057,632

ELECTRIC RESISTANCE WELDING SYSTEM

Filed Nov. 12, 1930     3 Sheets-Sheet 3

INVENTOR.
Earl J.W. Ragsdale.
BY
ATTORNEY.

Patented Oct. 13, 1936

2,057,632

UNITED STATES PATENT OFFICE 2,057,632

ELECTRIC RESISTANCE WELDING SYSTEM

Earl J. W. Ragsdale, Norristown, Pa., assignor to Edward G. Budd Manufacturing Co., Philadelphia, Pa., a corporation of Pennsylvania Application November 12, 1930, Serial No. 495,044

9 Claims. (Cl. 200—33)

My invention relates to electric resistance welding systems and more particularly to timing devices applicable thereto, although of general application to other uses.

Its object is to attain instantaneous welds and to perfect the accuracy of measurement and control of the instantaneous interval of the weld.

I have discovered that extremely high currents and voltages can be employed in resistance welding, attaining values manifoldly greater by several times than those heretofore attainable, particularly in spot welds, and even in cases where the area of the spot is relatively only a small fraction of the area commonly used heretofore, if but the time of application of the welding current can be made substantially instantaneous and the interval of its application accurately and reliably controlled. This discovery is a new method of my invention which is being claimed in another application. I contemplate application of welding current for very short welding periods, for example, as short as one one hundred and twentieth of a second and/or shorter or longer periods. With extremely short intervals the current is immense whereas with longer timing the current may be smaller. Such immense currents, of course are possible only if the instantaneous time interval is just right, neither too short nor too long. Too short an interval by any fraction will result in an incomplete welding of the part and the slightest fraction over the precise time interval required for completion will either deleteriously affect the material being welded or burn and weaken the weld and mar the material.

When we are dealing with time intervals of such low instantaneous values as even 1/500 of a second, the ratio between the time required for relative manipulation of the article and the electrodes from one welding position to another, as for example, from one spot weld to another, to the instantaneous time interval of the weld becomes extremely great. With longer welding time periods, for example one-third second, this ratio is smaller. Times of from ¼ to 1 second and upwards are required to relatively manipulate the work and the electrodes. Therefore apparatus which in one movement at ordinarily used velocities of movement provides both the time interval for manipulation and the time interval for the weld becomes entirely inadequate to take care of the situation. The instantaneous time of welding is so small a fraction of the total time for welding and ensuing manipulation that impractical proportioning of parts is necessary. Likewise welding control apparatus having usual magnetic, electric and mechanical inertias and lost motion resulting in time loss, (not to mention a variable time loss), in operation entirely upset the balance of time intervals, and preclude that absolute precision necessary for the obtaining and maintaining the accuracy of the instantaneous time interval of welding. An ancillary object of my invention is, therefore, the elimination of such magnetic, electric and mechanical inertias and variable time losses from the control systems of welding apparatus.

The overcoming of these insufficiencies of prior welding systems to meet the demands of my new method and the attainment of the objects of my invention I attain by the control of the energy of the welding current of an alternating circuit system comprising primary and secondary circuits by the use of an instantaneous time switch directly controlling through its circuit closing and opening contacts the connection of the primary circuit to the source of power. This time switch is a sliding contact switch determining the time intervals of energization of the primary circuit by the duration of its sliding contact. Adjusting means are provided to accurately adjust the duration of closure of the primary circuit through the sliding contact. The instantaneous time switch is an intermittently acting switch. Its circuit governing elements are operated under a decelerating velocity. The time selective means are arranged to derive their times from shortest to longest in succession from the highest to the lowest velocities of the decelerating governing elements. The intermittent action ends after the loss of the decelerating velocities and the residual action is shock absorbed at the close of each operation. A lock-out for the time switch is provided to become automatically effective after each measured instantaneous time interval of weld to lock the time switch from governing action. Means are provided whereby this lock-out becomes effective only between successive measured time intervals. Re-conditioning means for the lock-out render it again effective but this conditioning means like the lock-out itself is effective upon the lock-out only between successive measured time intervals.

In the best form of my invention now known to me which I shall describe in detail for the purpose of illustrating it, the instantaneous chronometric device takes the form of a disc having an instantaneous acceleration and deceleration of the order of that of a pendulum. Its acceleration is provided by a spring affording a potential energy under a movement of a hand or foot operated lever. One revolution and stop mechanism provides its intermittent character operation. Sliding contacts which it carries co-act variably with the selective system of commutator segments of different angular expanse for selection of instantaneous times. The lock-out is constituted by the stop mechanism effective only between the effective instantaneous time intervals of circuit closure. The re-conditioning means for the lock-out enabling a succeeding governing action of the device takes the form of a sear operated from the same manual lever from which the potential energy of the intermittent action is derived and coacting with the stop mechanism in an appropriate manner.

In the drawings:—

Figures 4 to 10 inclusive, are diagrammatic views illustrating respectively predetermined settings for the machine whereby varying welding times capable of attainment by the machine are obtained.

In all of the above described views, like characters of reference are employed to designate like parts throughout.

Figure 3:
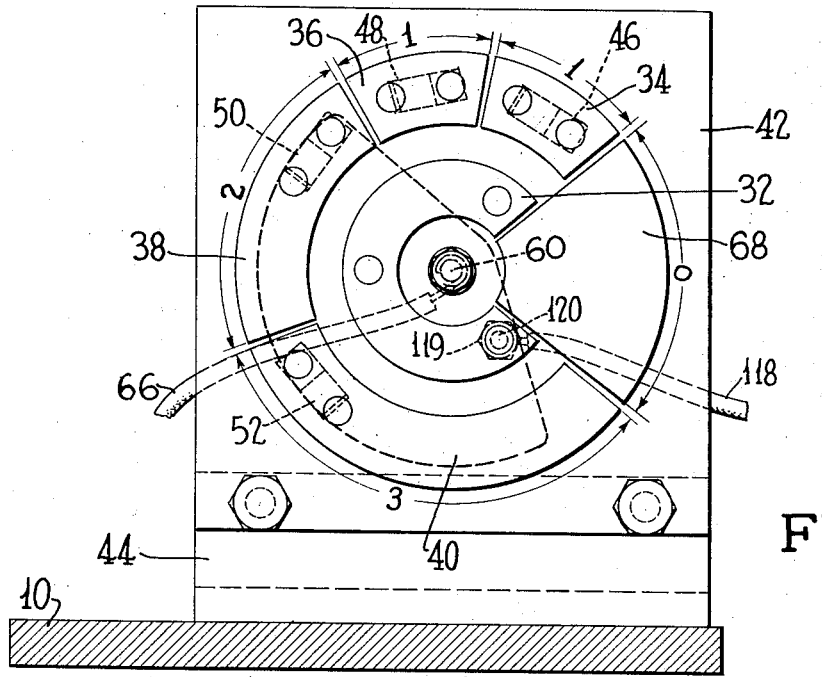
Figure 3 is a sectional view taken substantially along the line 3—3 of Fig. 1.

The machine involves in its general organization, a suitable base plate 10 upon which are mounted a pair of standards 12, 14 which standards support therebetween a hollow tubular stationary shaft 16. The extreme ends of the shaft 16 are provided with internal recesses 18 in which are mounted a pair of ball bearing units 20 which units operate to retain therebetween a rotatable shaft 22. The shaft 22 carries at one end thereof a relatively heavy disk 24 which disc is keyed or otherwise secured to the shaft and adapted to rotate therewith. The disk 24 has mounted thereon a contact carrying plate 26 insulated as at 28 from the same and this contact carrying plate has mounted thereon a pair of bridge contacts 30 electrically connected together through the plate, and spring-pressed away from the plate by means of a coil spring 81. These contacts are adapted to bridge selectively a ring contact 32 and a plurality of annularly disposed contact plates 34, 36, 38 and 40 mounted upon a stationary block 42 (Fig. 3).

The end of the shaft 22 opposite the rotatable disc 24 and outside the standard 14 is provided with a ratchet wheel 83 adapted to be engaged by a spring pawl 85 bolted at 87 or otherwise secured to the standard 14. Thus it will be seen that the shaft 22 is permitted to rotate in but a single direction.

The block 42 is bolted or otherwise secured to a standard 44 in turn secured to the base plate 10. The stationary plate 42 is formed of insulating material such as bakelite, pressed composition, wood, or the like, and is properly spaced from the rotatable plate 24 so that the contacts 30 may contactually engage the ring contact 32 and the contacts 34, 36, 38 and 40 (Fig. 3) to bridge the same and energize the primary circuit of the welding circuit of the apparatus of the example illustrated in a manner to be described hereinafter.

The contact plates 34, 36, 38 and 40 are provided each with contacts 46, 48, 50 and 52 respectively on the outer side of the block 42 to which they are electrically connected by through bolts 54. A distributor 56 is secured to the block 42 centrally thereof. This distributor is in the form of a copper sector plate through which extends a bolt 60 secured in the block 42. A plurality of lock nuts 62 and washers 64 serve to position the distributor 56 on the bolt 60 in a predetermined angular position to selectively distribute current to one or more of the contacts 46, 48, 50 and 52 to supply this current to any contact plates 46, 48, 50 and 52, as may be desired. A handle 79 is secured to the distributor 56 to facilitate manual adjustment of the latter on loosening of the nuts 62. It is obvious that this adjustment may be located externally of the apparatus housing if this is desirable.

The distributor 56 receives primary energizing current through a lead-in wire 66 from a source not shown through power line 110. The other terminal of the primary circuit is connected electrically to the contact ring 32 connected with lead 118, so that current may at the proper time be conducted from one terminal of primary source to the distributor by way of 66 and from thence through one or more of the contact plates 46, 48, 50 and 52 and through the bridge contacts 30 to the ring contact 32 and by way of 67 back to the other terminal, (Fig. 3).

An insulating sector 68 (Fig. 3) is positioned on the block 42 and the disk 24 normally presents its bridge contacts 30 to the sector so that the controlled circuit 66, 118 is open. From the above arrangement of parts, it will be seen that with the disk so positioned, current issuing from the primary source cannot pass from any of the contacts 34, 36, 38, or 40 to the ring contact 32. It will also be seen, given a means for rotating the disk 24 at a predetermined rate of speed, that current will pass from the primary source through the distributor 56 to the contacts 34, 36, 38 and 40 through the bridge contacts 30 to the ring contact 32 during the precise length of time that the bridge contacts 30 bridge the ring contact 32 with any of the contact plates 34, 36, 38 or 40 that happen to be in contact with the distributor 56.

Figure 1:
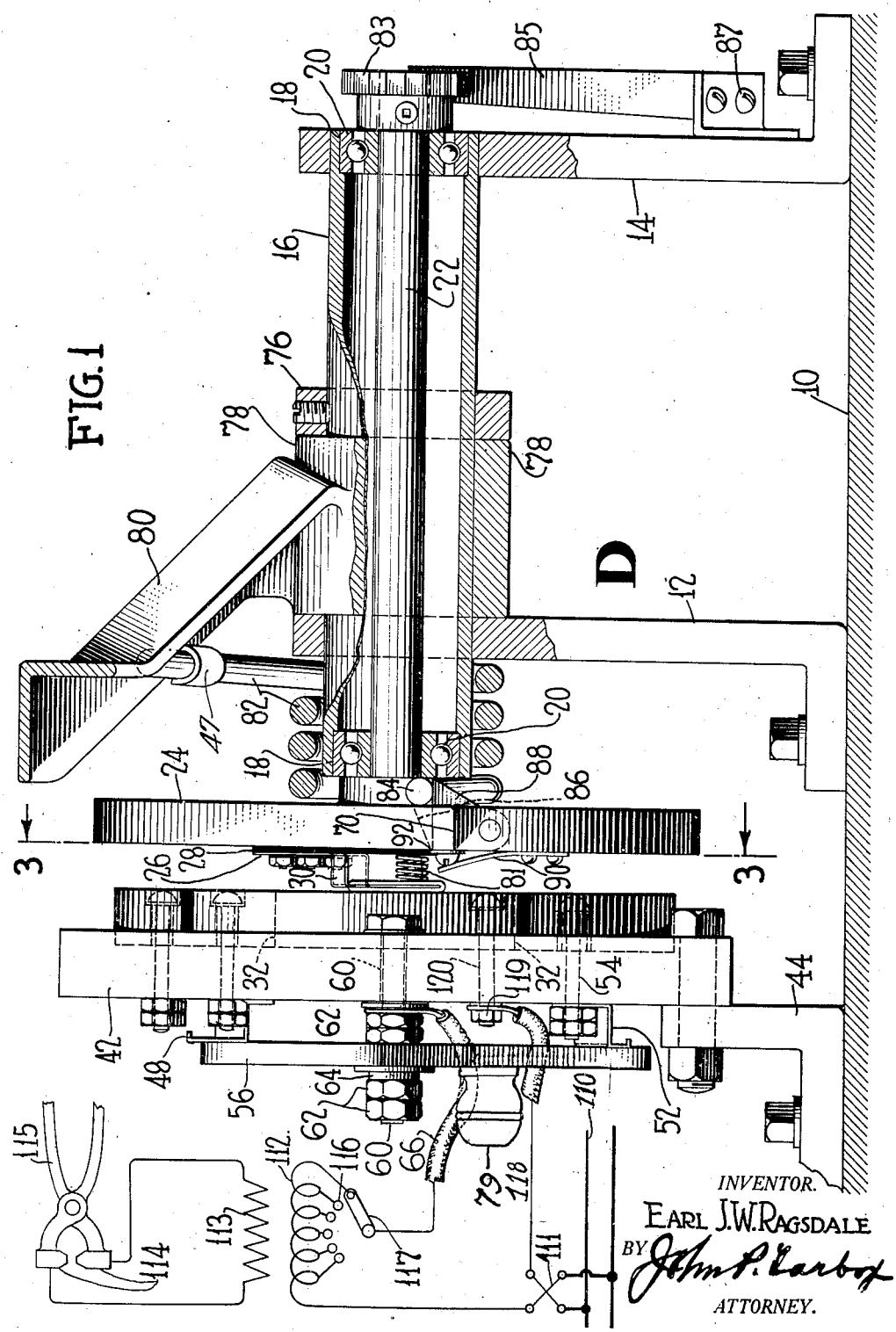
Figure 1 is a side view of the assembled device partly in section.
Figure 2:
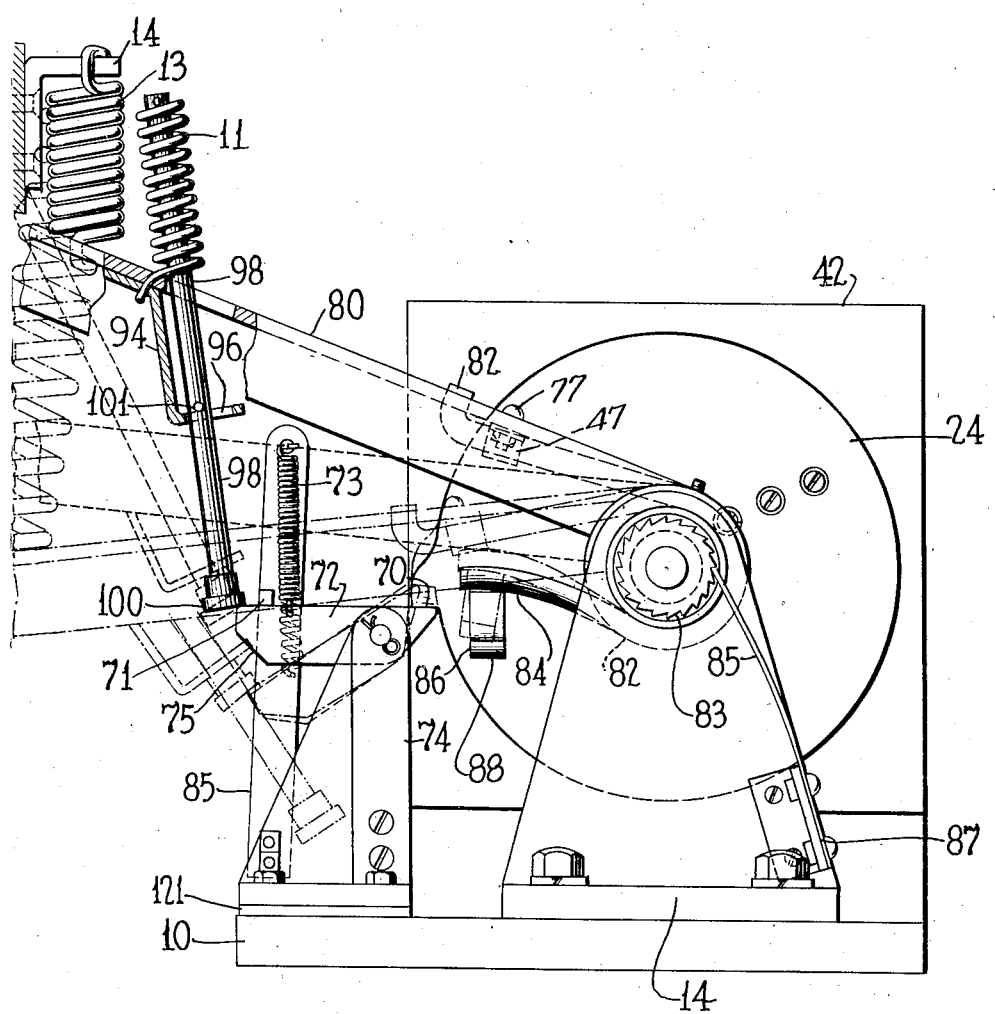
Figure 2 is an end view of the device, partly in section.

The means for rotating the disk 24 are shown in Figs. 1 and 2. They comprise an impelling means for imparting to the disk a potential torque, which when released through comparatively substantial inertia of the disk and the action of the impelling means, carries the disk through a complete revolution in a predetermined length of time and at an accelerating rate followed by a decelerating rate, after the manner of the swing of a pendulum, the impelling means acting upon the disc in the manner of gravity upon a pendulum.

Specifically, (see Fig. 2), the disk is provided with a stop 70 on the periphery thereof adapted to engage a stop sear member 72 pivoted in a standard 74, and normally held in a horizontal position by means of a spring 73 against a head 100. Normally, the disk occupies a position with the stop 70 engaging the latch member as clearly shown in Fig. 2 in full lines. The hollow shaft 16 is provided with a retaining collar 76 thereon (Fig. 1) and journalled upon the shaft between this collar and the standard 12 is a sleeve 78 formed integrally on an operating lever 80. The lever 80 has one end of a coil spring 82 secured thereto by a securing means comprising a bolt 77 and a saddle 47. This coil spring surrounds the shaft 16 and the other end of the same extends laterally as at 84. The disk is provided with an aperture 86 therethrough in which aperture is pivoted a pawl 88 spring-pressed outwardly of the face of disc 24 by leaf spring 90 secured to the disk. The pawl 88 has a stop 92 secured thereon for engaging the side of the disk to limit its extent of projection. The pawl 88 is normally engaged by the laterally extending arm 84 of the spring 82 and acts as an abutment to receive potential torque as developed in spring 82 by actuation of lever 80.

Depression of the lever 80 therefore will serve to cause the arm 84 to bear firmly upon the pawl 88 storing energy in the spring while the disk 24 is held against rotation by the projection 70 bearing against the latch member 72. The tripping of the latch member 72 will permit the spring 82 to expend its energy through pawl 88 to rotate the disk 24. The means for tripping the latch member 72 is operatively associated with the lever 80.

Referring to Fig. 2, the lever 80 has secured thereto a bracket 94 having a slot 96 therein through which slot extends a tripping rod 98 having a head 100 constituting a sear engaging latch 72. The tripping arm 98 has secured to its upper end a coil spring 11, the lower end of which spring is secured to the lever 80. The lever 80 is biased to normal position by a spring 13 secured to a stationary support 15, and in its normal position is elevated. Depression of the lever will through spring 11 cause the sear 100 to yieldingly bear against the latch 72 to depress the same against the action of the springs 73 and 82. The bracket 94 is formed of resilient material and normally urges the tripping rod and sear 100 over the outer end of the latch member 72. However, the latch member 72 is so constructed as to permit the sear 100 to slip off of the end of the same after the latch has been tripped. The latch is immediately returned after tripping to its normal position against stop 71 and upon releasing the lever 80, the cam surface 75 of the latch member 72 will deflect the sear 100 and rod 98 laterally when the arm is being returned to its normal position by reason of the spring 13. A pin 101 is secured in the arm 98. This pin projects enough to engage the sides of the slot 96, thereby limiting the downward movement when head 100 of rod 98 slips over latch 72.

Thus it will be seen that each time the lever is depressed, the disk 24 will be rotated one complete revolution or part at an accelerating rate depending upon the strength of the coil spring 82, the duration of spring travel, and the inertia of the disk.

The duration of the current flow through the work will be timed by the setting of the distributor disk 56. Referring now to Figs. 4 through 10 inclusive, the distributor 56 has been shown as occupying a plurality of different positions for effecting different welding conditions. The contact plates 34 and 36, the contact plate 38, and the contact plate 40 are of different lengths.

Figure 4:
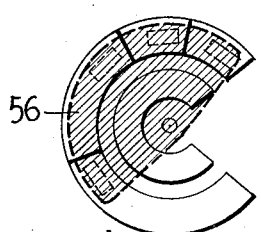
Figure 5:
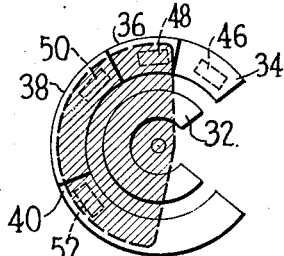
Figure 6:
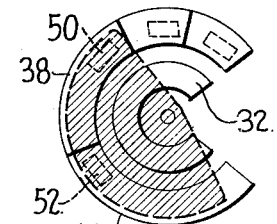
Figure 7:
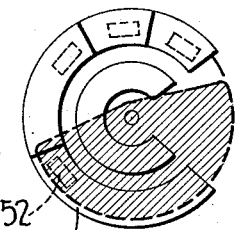
Figure 8:
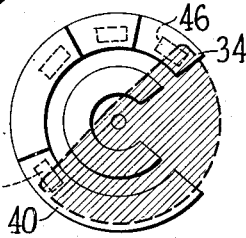
Figure 9:
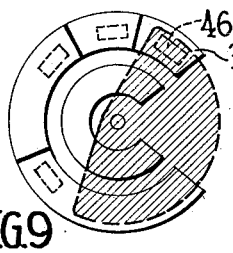
Figure 10:
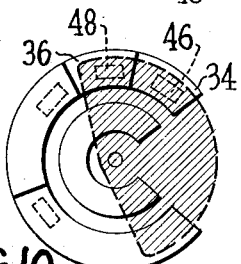

The contact plates 34 and 36 are the same length and represent each a unit length of welding time. The contact plate 38 is equal to the combined lengths of the contact plates 34 and 36 and represents two units of welding time, while the contact plate 40 is longer than the contact plate 38 and represents three units of welding time. In Fig. 4, the distributor by covering the contact plates 46, 48, 50 and 52 of the contact plates 34, 36, 38 and 40, serves to connect all of these contact plates together and the bridge contact 30 in transversing these contact plates serves to pass current through the circuit for a period of time equal to seven arbitrary units of time. In Fig. 5, the distributor, by connecting the contacts 48, 50 and 52 of the contacts 36, 38 and 40, connects these three latter contact plates together electrically so that the bridge contact will permit the welding current to flow through the work during six of the arbitrary units of time. In Fig. 6, the distributor by covering the contacts 50 and 52 of the contacts 38 and 40 combines two arbitrary units of welding time with three of these arbitrary units and thus the welding operations consume five units of welding time. In Figs. 7, 8, 9 and 10, the units of welding time consumed are three units, four units, one unit and two units, respectively, as may be determined by the setting of the distributor over the various contacts. In Fig. 9, the distributor which engages only the contact 46 permits the shortest length of welding time, to be effected, namely one unit of time. While four contact plates have been shown, it is obvious that greater or lesser number may be employed, if desired, and thus the welding time may be varied accordingly. The shorter contacts are traversed when disk 24 has reached its maximum velocity, and the longer during the stages of deceleration, due to brush friction.

The present timing device is what may be termed an instantaneous interval time switch, a chronometric circuit controlling device capable of accurately measuring extremely minute fractions of time of an order dealt with in the electrical world by the ordinary oscillograph or the cathode ray oscillograph. The time intervals between the opening and closing circuits by the device D are adjustable with the very greatest facility by the movement of distributor 56 to the various combinational contact positions outlined in Figs. 4 to 10. These may be varied widely to suit various conditions. The extreme accuracy is greatly enhanced through the placement of this device D directly in the primary circuit eliminating all other control switches and circuits. The perfection of measurement of these instantaneous time intervals is enhanced through the clear cut closing and opening of the circuits effected by the extended arcs of the sliding contacts. The make is perfectly timed. The break is also perfectly timed and with appropriate flaring of the ends of the contacts to take care of the arc, or any of the well known devices for quick arc extinguishing, is so sharp as not to detract from the accuracy of the measured time interval. The extremely high velocities of the disc 24 necessary to attain the instantaneous minute time intervals themselves contribute greatly to the sharpness of the break. The intermittent action of this time switch divorces the extremely minute welding time interval measurement from the relatively great and desirably greatly variable time intervals of work and welding electrode manipulation. Arrangement for the derivation for the shortest of the instantaneous welding time intervals through action of the disc 24 when at its peak velocity and the lengthened such time intervals as its velocity decelerates through the general serial arrangement from shortest to longest of contacts 34 to 40 in the direction of progression of disc 24 and bridge contact 30 improves the accuracy of the most minute intervals through making possible greater lengths of the shorter segments 34 and 46, and the opening of the circuit under conditions of highest velocity.

The instantaneous time intervals are so minute that within them it is impossible to manually manipulate lever 80 twice. In other words, the potential energy of spring 82 accelerates disc 24 to a velocity in excess of that at which lever 80 and the associated parts can possibly be reciprocated. There results therefore but one application of current for each reciprocation of the actuating lever 80.

The timing disc 24 makes one revolution and is stopped positively by the sear 72, its residual inertia being absorbed by the rubber cushions 121 provided beneath the base of standard 74. The disc 24 together with the projection 70 and the sear 72 constitute a one revolution and stop device. Projection 70 together with latch 72 are effective as a lock-out of the time switch only between successive time intervals whereby irrespective of the position of lever 80 and successive operations, disc 24 and contact 30 cannot be stopped in the midst of a weld and the time interval accurately measurable by the device cannot be foreshortened by mal-operation of the lock-out. Similarly, the sear 72 in conjunction with the tripping rod 98 and its head 100 constitute a re-conditioning means for the lock-out likewise effective only between successive measured time intervals, for the head 100 must needs be retracted all the way from its dotted line to its full line position before the lock-out can be re-conditioned for a succeeding operation of the device. Neither can two applications of current in succession be made, nor can the movement of disc 24 or its velocities in successive angular positions be mal-adjusted with respect to segments 34 to 40 and the time of commencement or the duration of the weld altered unwantedly. Spring 82 constitutes a potential energy device in which energy is stored by the manual operator 80.

Many modifications of the system and probably innumerable modifications of the timing device D, its principal element, are possible. The device and the circuits which I have shown constitute but the best embodiment now known to me. All others which fall within the generic spirit of the invention should be protected to me by the annexed claims.

What I claim as new and useful and desire to protect by Letters Patent is:

1. A timing device for momentarily closing an electrical welding circuit comprising a stationary contact, a uni-directional, rotatable disc having a movable contact thereon adapted upon rotation to engage the stationary contact in passing and close the circuit, means for positively locking said disc against rotation, potential energy tensioning means for urging said disk to rotate against said locking manual means, means for releasing said locking means to permit said urging means to impel said rotatable member into free rotation, and means for causing said locking means to limit the movement of said disk.

2. A timing device for momentarily closing an electrical welding circuit comprising a plurality of stationary contacts having lengths which are true multiples of one another, a movable contact adapted to successively engage said stationary contacts to close the circuit when said stationary contacts are connected in the circuit, and means for selectively connecting one or more of said contacts in the circuit independently of said movable contact.

3. A time switch comprising a high speed unidirectionally rotatable switch element, potential energy means to operate said switch element, means in the circuit path for adjustably predetermining the effective circuit energizing live interval of said switch independently of the high speed switch elements per se, means for initiating the operation of said switch, and means arranged to prevent more than a single timed closure of the switch for each actuation of said initiating means.

4. A timing device for momentarily effecting the energization of a circuit comprising a plurality of relatively fixed and movable contacts, certain of said fixed contacts having lengths which are non-arithmetical multiples of one another, a movable contact arranged to successively engage said fixed contacts to effect one continuous timed closure of a circuit only, and means for selectively connecting one or more of said relatively fixed contacts together in arithmetical series to control the time of energization of the circuit.

5. An electric switch comprising relatively movable contacts arranged upon engagement to effect the energization of a circuit, driving means for effecting operation of said contacts, release means to initiate said operation, limiting means for limiting the operation of the switch to one effective circuit closing and opening operation for each actuation or continued actuation of said release means, and adjusting means having relatively fixed and movable contacts adjustable while the switch is in use to vary the effective length of one of said relatively movable switch contacts.

6. A timing switch for electric circuits comprising relatively movable contacts arranged to effect through their engagement the energization of a circuit, driving means for effecting operation of said contacts, release means to initiate said operation, limiting means for limiting the operation of the switch to one effective circuit closing and opening operation for each actuation or continued actuation of said release means, and means having relatively fixed and movable contacts adjustable while the switch is in use to vary the effective length of one of said relatively movable switch contacts, said last-named means being independent of the first-named movable contacts.

7. A timing device for electric circuits comprising relatively movable contacts arranged to effect the energization of a circuit, driving means for effecting operation of said contacts, release means to initiate said switch operation, means to limit the operation of the switch to one effective cycle of operations for each actuation or continued actuation of said initiating means, and means having relatively fixed and movable contacts arranged to vary the effective length of said relatively movable contacts, said last-named means having a stationary commutator adjustment.

8. An electric circuit timing switch having relatively movable contacts arranged to effect the energization of the circuit, driving means for effecting operation of said contacts, release means to initiate said switch operation, limiting means for limiting the operation of the switch to one effective circuit closing and opening operation for each actuation or continued actuation of said initiating means, and means having relatively fixed and movable contacts adjustable while said switch is in use to vary the effective length of one of said relatively movable switch contacts, said means providing adjustment of the number of said relatively movable contacts and the number of unit time intervals controlling the total energization period of the circuit.

9. A timing switch for electric circuits comprising a plurality of contacts fixed in space, said contacts varying in length in non-arithmetical multiples of each other, and means for connecting said contacts in series relation in arithmetical multiples, a second set of fixed contacts arranged in the arc of a circle, a uni-directionally movable contact normally held out of contact with said fixed contacts, a spring arranged to impart potential energy thereof to said movable contact, initiating means for creating potential energy condition of said spring and releasing said contact, means retaining said contact in locked disengaged position at the end of one circuit closing operation and maintaining said spring in released condition, and means presenting said contact from rotating in an opposite direction.

EARL J. W. RAGSDALE.